(Model.)
C. H. REID.
CHUCK.
No. 398,447.  Patented Feb. 26, 1889.
Fig I
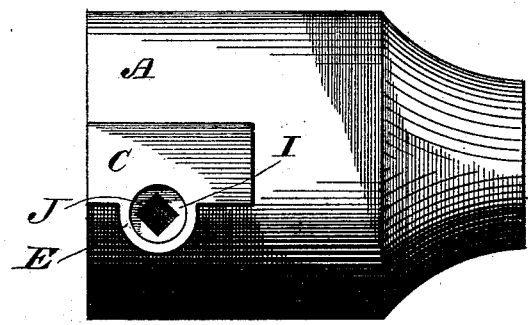
Fig II
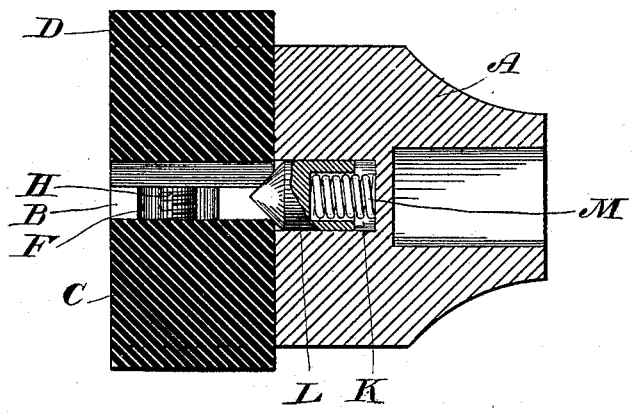
Fig III  Fig IV
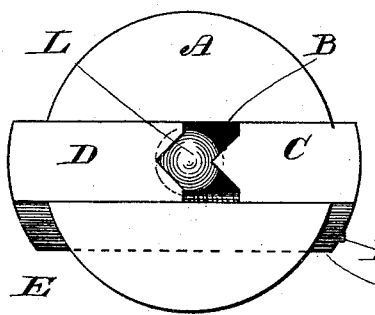 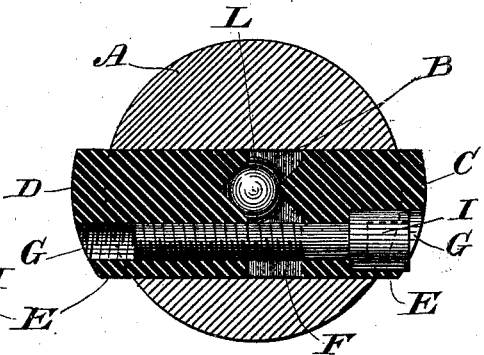
Witnesses,
S. S. Williamson
E. S. Sumner
Inventor
Charles H. Reid,
By Smith & Hubbard
Attys

United States Patent Office.

CHARLES H. REID, OF DANBURY, CONNECTICUT.

CHUCK.

SPECIFICATION forming part of Letters Patent No. 398,447, dated February 26, 1889.

Application filed January 23, 1886. Serial No. 139,482. (Model.)

*To all whom it may concern:*

Be it known that I, CHARLES H. REID, a citizen of the United States, residing at Danbury, in the county of Fairfield and State of Connecticut, have invented certain new and useful Improvements in Chucks; and I do hereby declare the following to be a full, clear, and exact description of the invention, such as will enable others skilled in the art to which it appertains to make and use the same.

My invention relates to certain novel and useful improvements in chucks, and has for its object to provide such a device as shall center the drill and cause the jaws to travel with proper relative speed to each other without regard to the action of the operating-screw; and with these ends in view my invention consists in the details of construction and combination of elements hereinafter explained, and specifically designated by the claims.

In order that those skilled in the art to which my invention appertains may fully understand its construction and operation, I will proceed to describe the same in detail, referring by letter to the accompanying drawings, forming a part of this specification, in which—

Figure I is a side view of my improved chuck; Fig. II, a central section; Fig. III, an end view, and Fig. IV a section taken at the line $x$ $x$ of Fig. I.

Similar letters denote like parts in all the figures of the drawings.

A is the body of the chuck, in which is formed a central channel or way, B, and C D are male and female jaws adapted to slide freely within said channel.

E are ribs formed along the sides of the jaws and adapted to fit and slide in a corresponding groove, F, formed in the side wall of the channel, thus retaining the jaws in the body without preventing their longitudinal movement.

G are holes formed partly in the ribs and partly in the jaws proper.

H is the operating-screw, having preferably a threaded end and a smooth shank, the former engaging with threads in the hole G in the female jaw and the latter turning freely in the hole in the male jaw.

I is an enlargement or head on the outer end of the screw for retaining said screw in the jaw, and J is a wrench-hole formed in the head for operating the screw.

In the body of the chuck back of the jaws is a recess, K, and L is a pin having a free longitudinal movement in said recess. The outer end of this pin is conical, and is forced between the inner ends of the jaws by a coil-spring, M, which is placed within the recess back of said pin, for the purpose presently explained. Heretofore a differential speed has been imparted to the jaws by means of an operating-screw having right and left handed threads, and by this means the work or drill was centered, and, furthermore, it was necessary, of course, that this operating-screw should be located within the body of the chuck and confined as to any longitudinal movement. In this latter construction it was found to be exceedingly difficult to assemble the jaws on the screw so that their movements would be so timed that the jaws would arrive at the axial center of the chuck simultaneously; also, the least wear on the threads of the screw caused lost motion of the jaws, which was fatal to the operation of the chuck, and the constant friction at the ends of the screw-shaft caused more or less longitudinal play of the shaft itself, which also defeated the purposes of the chuck and necessitated the introduction of collars to relieve or take up this strain. None of these disadvantages can be incidental to my present construction, since lost motion is absolutely immaterial, as will be obvious from the operation of my improvement, which I will now set forth.

The grasping-surface of the female jaw is V-shaped, and it will accordingly have two points of contact with the cone, for the reason that the sides of the V are tangents to the cone. The male jaw has but one point of contact, which is in the same horizontal and vertical plane with the axial center of the cone.

The two jaws are in constant contact with the cone, as shown in the drawings, and the distance from the axial center of the cone to the apex of the female jaw is greater than the distance between the axial center of the cone and the apex of the male jaw. Therefore, in order that the apices of the two jaws should meet at this center, the female jaw will have to travel farther than the male jaw.

In the operation of the female jaw the resistance between said jaw and cone will be exerted in a straight line between the point of contact of this jaw and cone and the axial center of the latter; but this line of resistance is not parallel to the line of movement of the jaw, and it therefore follows that the actuation of this female jaw is opposed by a yielding resistance constantly applied at an angle to the line of movement of said jaw, or, in other words, along the inclined walls of the latter, and the speed of the movement of this jaw is therefore quicker than if the resistance were opposed directly to the line of movement of said jaw. Now in the operation of the male jaw the resistance of the cone to said jaw is also applied in a straight line between the point of contact of this jaw and cone and the apex of the cone; but said line is parallel with the line of movement of said jaw, and the speed of the latter will therefore be less than that of the female jaw, the comparative speeds of the two jaws being in the direct ratio of the distances of the apices or centering-points of the jaws from the apex of the cone when said jaws are distended to any degree.

The angle of the V is immaterial, as the only effect will be to increase the distance between the apices of the cone and said V as the angle of the latter is decreased.

As the centering of the drill does not depend upon the action of the operating-screw, it is immaterial whether the screw be single or double threaded, as its only function is to close the jaws against the drill.

Another advantage of this construction is, that the threads of the screw engage with the female threads in the jaw throughout their entire circumference, while in the ordinary form of chuck only one-half or less than half of the circumference of the male threads are in engagement.

Having thus fully described my invention, what I claim as new and useful is—

1. In a chuck, the jaws arranged to slide freely within the chuck-body, in combination with an operating screw or bolt passed through said jaws independently of the body, substantially as shown and described.

2. In a drill-chuck, the combination, with two jaws and a screw for closing the same, of a new means for imparting a differential speed to the jaws for the purpose of centering the drill, consisting of a spring-actuated cone interposed between said jaws, as and for the purposes set forth.

3. In a drill-chuck, the male and female jaws adapted to slide in the body of the chuck, in combination with an actuating-screw passed through said jaws and a spring-actuated centering-pin having a conical end adapted to be forced between the jaws, and thereby determine the relative speed of the travel of said jaws, substantially as shown and described.

In testimony whereof I affix my signature in presence of two witnesses.

CHARLES H. REID.

Witnesses:
S. S. WILLIAMSON,
W. T. HAVILAND.